United States Patent [19]
Yasima et al.

[11] 3,819,565
[45] June 25, 1974

[54] METHOD FOR THE PRODUCTION OF HIGH-STRENGTH CEMENT

[75] Inventors: Teturo Yasima; Takao Morisawa, both of Yokkaichi; Eiichi Tazawa, Tokyo; Yasuhiko Tsuruta, Sagamihara, all of Japan

[73] Assignees: Mitsubishi Petrochemical Co., Ltd.; Taiseikensetsu Kabushiki Kaisha, both of Tokyo, Japan

[22] Filed: Oct. 24, 1972

[21] Appl. No.: 299,847

Related U.S. Application Data

[63] Continuation of Ser. No. 130,457, April 1, 1971, abandoned.

[30] Foreign Application Priority Data

Apr. 4, 1970 Japan.............................. 45-28376

[52] U.S. Cl. ...... 260/42.13, 260/29.6 S, 260/29.7 S
[51] Int. Cl. ........................................... C04b 13/30
[58] Field of Search ... 260/29.6 S, 29.6 RB, 29.6 R, 260/41 R, 41.5 R

[56] References Cited
UNITED STATES PATENTS 3,228,907  1/1966  Eash .............................. 260/29.6 S
3,437,619  4/1969  Nutt................................ 260/29.6 S Primary Examiner—Harold D. Anderson
Attorney, Agent, or Firm—Flynn & Frishauf

[57] ABSTRACT

Method of the production of high-strength cement which comprises incorporating into normal or high-early-strength cement a macromolecular material formed by copolymerization of at least one monomer which will form homopolymers having a second-order transition point above room temperature, i.e., about 20° C. and at least one monomer which will form homopolymers having a second-order transition point below room temperature, i.e., about 20° C. in the form of a dispersion in water using an emulsifier mainly composed of a nonionic material at a ratio from 3 to 30% by weight of solid content of the macromolecular material based on the cement material and subjecting the mixture to hardening at normal temperature (about 20° C.) for a period from 4 hours to 14 days followed by heat or steam treatment at a temperature from 50° to 150° C. for a period from 10 minutes to 3 days.

6 Claims, No Drawings

METHOD FOR THE PRODUCTION OF HIGH-STRENGTH CEMENT

This is a continuation of application Ser. No. 130,457, filed Apr. 1, 1971 which has been abandoned.

BACKGROUND OF THE INVENTION

1. Field of the Invention

This invention relates to a method for the production of macromolecular material-cement mixtures of high strength by blending with a cement material a water-soluble, water-dispensable and water-suspendable macromolecular material. More particularly, it relates to a method for the production of macromolecular material-cement mixtures which comprises incorporating into normal or high-early-strength cement a macromolecular material formed by copolymerization of at least one monomer which will form homopolymers having a second-order transition point above room temperature, i.e., about 20° C. and at least one monomer which will form homopolymers having a second-order transition point below room temperature, i.e., about 20° C. in the form of a dispersion in water using an emulsifier mainly composed of a nonionic material at a ratio from 3 to 30% by weight of solid content of the macromolecular material based on the cement material and subjecting the mixture to hardening at normal temperature for a period from 4 hours to 14 days followed by heat or steam treatment at a temperature from 50° to 150° C. for a period from 10 minutes to 3 days, thereby forming continuous or pseudo-continuous phases of the combined molecules of said macromolecular materials in the cement structure developed during the initial hardening.

2. Description of the prior art

Attempts have been heretofore made to increase the strength of cement materials after hardening by incorporating a macromolecular material. Admixtures mainly composed of a macromolecular material dispersed or dissolved in aqueous phase have been particularly prepared for trail and, in part, placed for practical use. These prior-art products, however, exert only several tens of percent increase in strength, especially in bending strength, which does not enable the use of the products after hardening as a new construction material. In practice, they are used only by virtue of increase in adhesion strength secondarily developed.

SUMMARY OF THE INVENTION

After an extensive investigation of the admixture mainly composed of a macromolecular material dispersed or dissolved in water, we have found that remarkable increase in strength can be resulted by adequate selection of the combination of the main component macromolecular material and the auxiliary component emulsifier as well as by special process for curing during hardening of the cement. As a result of the foregoing investigation and discovery, we have devised the process of the present invention as mentioned above. According to the process of this invention increase in strength is so remarkable as, for example, being 400% in increase in bending strength.

As set forth above, the macromolecular material and the emulsifier for producing a dispersion of the former in water should be of special natures and, in addition, process for curing after the addition is especially important. Combination of the above-mentioned two conditions only will lead to achievement of the desired object.

DESCRIPTION OF THE INVENTION

First, in order to increase the strength of a cement product after hardening by incorporating a macromolecular material it is desirable that the macromolecular material is dispersed in the cement as wide as possible. Imperfect dispersion will often cause defects of the structure after hardening, or will be economically disadvantageous because of need of a larger amount of the macromolecular material.

In general, production of the dispersion of a macromolecular material in the cured cement as in the instant process is easily and economically performed by adding the macromolecular material in the form of a dispersion or solution in the water employed. We have discovered that emulsifiers mainly composed of a nonionic material at a ratio of 50% by weight or higher of the active component are especially suitable as the dispersing agent. The remaining portion of the emulsifier may be either an anionic or a cationic material, but the anionic material, if present in a high content, is not preferable due to its tendency to produce poor dispersion with inorganic ions and alkalies contained in the cement.

The method of adding the polymeric materials and emulsifiers to cement may be any of conventional means of blending, including, for example, blending cement and aggregate followed by blending with water, because the method per se is not critical for achieving the object of the instant process.

Next, it was found that use of the polymeric materials and emulsifiers according to this invention greatly improve fluidity of the mixture after blending of cement, water and aggregate with the result that the water-cement ratio, that is, content of water can be greatly reduced or improved. Especially so when solid content of the macromolecular material in the original liquour for the product is in a range of from 5 to 10% by weight based on the cement. Although the effect will be great even with more than 10% by weight, the improvement is not proportional to the solid content of the macromolecular material. In order to enhance the effect it is desirable to use a macromolecular component containing a larger portion of the homopolymer having a relatively high second-order transition point such as, for example, styrene or methyl metacrylate. In addition, it was found that effect of increasing the strength by means of heat treatment under the specific conditions during curing as set forth below is greater when the effect of improving the water-cement ratio is greater.

Heat treatment during curing is one of the procedures critical for producing the desired results by the instant process. Although wide dispersion of the macromolecular material in the cement mixture can be effected by this instant process, the dispersion along will not be sufficient to achieve the object of the instant process and, in some instances, will result in reduction of the strength as compared with the product with addition of no macromolecular material. We have now found that a special design, heat treatment under specific conditions, produces good results as described below in Examples. Of course, the heat treatment alone will not achieve the object of the instant process, and combination thereof with use of the admixture as described above is essential.

Improper selection of the admixture will result in poor dispersion of the macromolecular material when water-hardening reaction of the cement occurs to form a water-hardened structure and, in some instances, will inhibit formation of the water-hardened structure. On the other hand, the macromolecular material widely dispersed in the water-hardened structure, as it is, is not capable of functioning to increase the strength. As a result of extensive investigations we have found that heat treatment of the water-hardened structure containing such a dispersed macromolecular material results in a remarkable increase in strength.

The results of our investigations indicate that the temperature condition during the heat treatment should be properly fixed and, in fact, higher or lower temperatures during the heat treatment have not produced the desired results. For example, when an emulsion of a 50:50 by weight butyl acrylate-styrene copolymer is used at a ratio of 5, 10, 15 or 20% by weight, the maximum bending strength was produced at a heat-treatment temperature of 70° C. and the desired improvement of bending strength was not attained at temperatures higher than 170° C.

The temperature at which the maximum bending strength results depends upon the nature of the admixture. With the macromolecular materials used in the present invention, the heat treatment at a temperature of from 50° C. to 150° C. has been found to produce satisfactory results of improvement. The present invention is characterized by the use of a macromolecular material formed by copolymerization of at least one monomer which will form homopolymers having a second-order transition point above room temperature and at least one monomer which will form homopolymer having a second-order transition point below room temperature as well as by the heat treatment at a temperature as specified to be within a range of from 50°C. to 150° C. The mechanism by which the heat treatment participates in increasing the strength is not certain, but the mechanism is assumed to further micro-dispersion of the macromolecules thereby forming a pseudo-continuous phase of the macromolecules in the water-hardened structure, formation of a three-dimensional net structure by mutual fusing thereby forming a continuous phase of the macromolecules in the water-hardened structure, filling the void in the water-hardened structure thereby eliminating the dynamic defect by adhesion and the like. In addition, the heat treatment induces redispersion or elimination from the system of the water in excess of the amount required for water hardening, which is considered as adversely affect the water-hardened structure after considerable development of the water-hardened fine structure of the cement. The above-mentioned effect is presumed to be remarkably promoted by the incorporation of macromolecular material.

Close relationship between the admixture as mentioned above and the heat treatment according to the instant process, which may be recognized from the descriptions given above, is a novel finding which produces outstanding results.

A variety of macromolecular materials are effective as the main component of the admixture, among which such materials as cited below are especially excellent in enhancing effect of the heat treatment mentioned above. Macromolecular materials after copolymerization of a monomer which will form homopolymers having a second-order transition point above room temperature, i.e., about 20° C. and a monomer which will form homopolymers having a second-order transition point below room temperature, i.e., about 20° C. are suitable. Particularly, compositions containing at least one of the latter in a portion below 95% by weight, preferably, but not necessarily, those containing a larger portion by weight of the former than of the latter are suitable. Illustrative of the former is listed in Table 10 and illustrative of the latter in Table 11.

Combinations of means of heating, means of curing or temperature and days of curing may be numerous and it is essential that these are within the ranges mentioned above. As the cement material may be used not only portland cements such as normal cement and early-strength cement but also any water-hardening cements such as alumina cement and magnesia cement.

DESCRIPTION OF PREFERRED EMBODIMENTS

The examples which follow are submitted to illustrate and not to limit this invention.

EXAMPLE 1.

Cement test samples were prepared using an admixture cited in Table 1 below in formulation of proportions of the ingredients mentioned in Table 2 below.

Table 1

| Composition of the admixture | | | | |
|---|---|---|---|---|
| High second-order transition component | | Low second-order transition component | | |
| Name | wt.% | Name | wt.% | Emulsifier |
| Styrene | 55 | Butyl acrylate | 45 | Nonionic |

Table 2

| Macromolecular material | Formulation | | | |
|---|---|---|---|---|
| (%) | Cement (g.) | Sand (g.) | Water* (g.) | Flow value (mm.) |
| 0 | 520 | 1,040 | 338 | 201 |
| 5 | 494 | 1,040 | 219 | 269 |
| 10 | 468 | 1,040 | 208 | 257 |
| 15 | 442 | 1,040 | 182 | 245 |
| 20 | 416 | 1,040 | 159 | 215 |

* The flow value, which is indicative of fluidity of the mixture, is adjusted to approximately the same value.

The test samples were pre-cured at normal temperature (i.e. about 20° C) for 8 days, followed by heat treatment at 70° C. and 100° C. for 24 hours. The results, which are shown in Table 3, were excellent. In the table the case wherein temperature of the treatment was 20° C. corresponds to the prior-art method with no heat treatment applied.

Table 3

Comparison of the strength

| Macromolecular material (%) | Temperature of the treatment (°C.) | Strength (Kg./cm.²) Bending | Compressive | Splitting |
|---|---|---|---|---|
| 0 | 20 | 91 | 394 | 41 |
|  | 70 | 111 | 414 | 49 |
|  | 120 | 84 | 379 | 50 |
| 5 | 20 | 61 | 314 | 36 |
|  | 70 | 158 | 576 | 57 |
|  | 100 | 128 | 523 | 57 |
|  | 170 | 68 | 418 | 18 |
| 10 | 20 | 71 | 301 | 37 |
|  | 70 | 198 | 552 | 75 |
|  | 100 | 154 | 523 | 73 |
|  | 170 | 83 | 418 | 36 |
| 15 | 20 | 59 | 241 | 31 |
|  | 70 | 202 | 515 | 69 |
|  | 100 | 170 | 463 | 73 |
|  | 170 | 98 | 345 | 35 |
| 20 | 20 | 57 | 163 | 22 |
|  | 70 | 234 | 514 | 72 |
|  | 100 | 179 | 447 | 70 |
|  | 170 | 108 | 280 | 34 |
| Without treatment |  | 90 | 398 | 40 |

EXAMPLE 2.

Test samples were prepared using an admixture cited in Table 4 in formulated proportions mentioned in Table 5.

Table 4

| Composition of the admixture | | | | |
|---|---|---|---|---|
| High second-order transition component | | Low second-order transition component | | |
| Name | wt.% | Name | wt.% | Emulsifier |
| Methyl metacrylate | 20 | Ethyl acrylate | 80 | Nonionic |

Table 5

| Macromolecular material (%) | Formulation | | | Flow value (mm.) |
|---|---|---|---|---|
|  | Cement (g.) | Standard sand (g.) | Water (g.) |  |
| 5 | 494 | 1,040 | 271 | 198 |
| 10 | 468 | 1,040 | 192 | 189 |
| 20 | 416 | 1,040 | 154 | 173 |

The test samples were pre-cured at normal temperature (i.e. about 20° C) for 10 days, followed by treatment at a temperature of 70° C. for 24 hours and then at a temperature of 120° C. for 2 hours. Excellent results were produced as shown in Table 6. The treatment at a temperature of 20° C., which is also listed, corresponds to the prior-art method with no heat treatment applied.

Table 6

Comparison of the strength

| Macromolecular material (%) | Temperature of the treatment (°C.) | Strength (Kg./cm²) Bending | Compressive | Splitting |
|---|---|---|---|---|
| 5 | 20 | 42 | 154 | 26 |
|  | 70 | 84 | 206 | 42 |
|  | 120 | 57 | 186 | 38 |
|  | 180 | 45 | 160 | 28 |
| 10 | 20 | 49 | 156 | 26 |
|  | 70 | 114 | 267 | 49 |
|  | 120 | 89 | 218 | 44 |
|  | 180 | 58 | 173 | 32 |
| 20 | 20 | 56 | 134 | 18 |
|  | 70 | 153 | 290 | 48 |
|  | 120 | 144 | 272 | 41 |
|  | 180 | 64 | 151 | 25 |
| Without treatment |  | 90 | 398 | 40 |

EXAMPLE 3.

Test samples were prepared using an admixture cited in Table 7 below in formulated proportions mentioned below in Table 8.

Table 7

| Composition of the admixture | | | | |
|---|---|---|---|---|
| High second-order transition component | | Low second-order transition component | | |
| Name | wt.% | Name | wt.% | Emulsifier |
| Vinyl acetate | 95 | Ethylene | 5 | Nonionic |

Table 8

| Macromolecular material (%) | Formulation | | | Flow value (mm.) |
|---|---|---|---|---|
|  | Cement (g.) | Standard sand (g.) | Water (g.) |  |
| 5 | 494 | 1,040 | 281 | 194 |
| 10 | 468 | 1,040 | 262 | 178 |
| 15 | 442 | 1,040 | 248 | 165 |
| 20 | 416 | 1,040 | 275 | 188 |

The test samples were pre-cured at normal temperature (i.e. about 20° C) for 8 days, followed by heat treatment at 70° C. and 100° C. for 24 hours. Excellent results were produced as shown in Table 9. The treatment at a temperature of 20° C., which is also listed, corresponds to the prior-art method with no heat treatment applied.

Table 9

Comparison of strength

| Macromolecular material (%) | Temperature of the treatment (°C.) | Strength (Kg./cm²) Bending | Compressive | Splitting |
|---|---|---|---|---|
| 5 | 20 | 57 | 264 | 35 |
|  | 70 | 104 | 339 | 41 |
|  | 100 | 89 | 335 | 27 |
|  | 150 | 70 | 270 | 25 |
|  | 200 | 51 | 201 | 21 |
| 10 | 20 | 58 | 207 | 29 |
|  | 70 | 119 | 337 | 47 |
|  | 100 | 87 | 272 | 36 |
|  | 150 | 73 | 230 | 32 |
|  | 200 | 61 | 223 | 30 |
| 15 | 20 | 68 | 235 | 29 |
|  | 70 | 192 | 496 | 50 |
|  | 100 | 129 | 350 | 49 |
|  | 150 | 88 | 290 | 41 |
|  | 200 | 76 | 259 | 33 |
| 20 | 20 | 64 | 190 | 22 |
|  | 70 | 170 | 438 | 53 |
|  | 100 | 112 | 318 | 41 |

Table 9-Continued

Comparison of strength

| Macro-molecular material (%) | Temperature of the treatment (°C.) | Strength (Kg./cm²) | | |
|---|---|---|---|---|
| | | Bending | Compressive | Splitting |
| | 150 | 83 | 274 | 35 |
| | 200 | 72 | 209 | 26 |
| Without treatment | | 90 | 398 | 40 |

In the above three examples, % of the solid content of the macromolecular material is by weight based upon the cement.

As clearly understood from Tables 3, 6 and 9 in the three examples above, surprisingly great improvements as much as from 200 to 400% increase is realized by the method according to the present invention as compared with the prior-art method. Whereas the maximum bending strength with normal concrete is around 60 Kg./cm.$^2$, that with the product obtained according to the method of this invention reaches a value as high as 234 Kg./cm.$^2$ being decidedly indicative of the excellent results produced by the present invention.

In addition to the examples, such excellent results were not produced using admixtures beyond the definition described above even after the heat treatment. A number of experiments indicated that neither homopolymers such as homopolymer of styrene, homopolymer of acrylamide, homopolymer of butyl acrylate, homopolymer of 2-ethylhexyl acrylate and the like, even with use of a nonionic emulsifier, not admixtures using an anionic emulsifier along, even when incorporated in the same way as in Examples, produced comparatively good results.

Tables 10 and 11, respectively, illustrate the monomers which form homopolymers having a high second-order transition point and those having a low second-order transition point.

Table 10

Examples of monopolymers which form homopolymers having a high second-order transition point

| Name | Typical second-order transition point of homopolymer (°C.) |
|---|---|
| Styrene | 103.0 |
| Vinyl acetate | 28 |
| chlorovinyl acetate | 23 |
| Vinyl chloride | 77 |
| Acrylonitrile | 91.0 |
| Cetyl acrylate | 35 |
| Methyl methacrylate | 100.7 |
| Ethyl methacrylate | 62 |
| Propyl methacrylate | 35 |
| Butyl methacrylate | 20 |

Table 11

Examples of monomers which form homopolymer having a low second-order transition point

| Name | Typical second-order transition point of homopolymer (°C.) |
|---|---|
| Ethylene | −122 |
| Propylene | −20 |
| Butadiene | −86 |
| Isoprene | −77 |
| Chloroprene | −50 |
| Vinylidene chloride | −18 |
| Methyl acrylate | 3 |
| Ethyl acrylate | −23 |
| Propyl acrylate | −44 |
| Butyl acrylate | −63 |
| 2-Ethylhexyl acrylate | −65 |

The second-order transition point of homopolymers greatly varies with the degree of polymerization. Those given above are typical ones, upon which the second-order transition point refrred to in the specification is based.

We claim:

1. Method for the production of a high-strength cement which comprises
    admixing with a normal or high-early-strength cement and sand a macromolecular material formed by copolymerization of a monomer (1) selected from the group consisting of styrene, vinyl acetate, chlorovinyl acetate, vinyl chloride, acrylonitrile, cetyl acrylate, methyl methacrylate, ethyl methacrylate and propyl methacrylate, which monomer forms a homopolymer having a second-order transition point above 20° C., and a monomer (2) selected from the group consisting of ethylene, propylene, butadiene, isoprene, chloroprene, vinylidene chloride, methyl acrylate, ethyl acrylate, propyl acrylate, butyl acrylate and 2-ethylhexyl acrylate, which monomer forms a homopolymer having a second-order transition point at or below 20° C., in the form of a dispersion in water containing an emulsion primarily comprised of a nonionic material, the ratio of solid content of the macromolecular material thereof to the cement being from 3 to 30 percent by weight,
    subjecting the resulting mixture to hardening at about 20° C. for a period of from 4 hours to 14 days, followed by heat or steam treatment at a temperature of from 50° to 150° C. for a period of from 10 minutes to 3 days.

2. Method of claim 1, wherein the composition contains a larger portion of monomer (1) than of monomer (2).

3. Method of claim 1, wherein monomer (1) is styrene.

4. Method of claim 1, wherein monomer (1) is methyl methacrylate.

5. Method of claim 1, wherein monomer (2) is butyl acrylate.

6. Method of claim 1, wherein monomer (2) is ethylene.

* * * * *